Patented Nov. 14, 1933

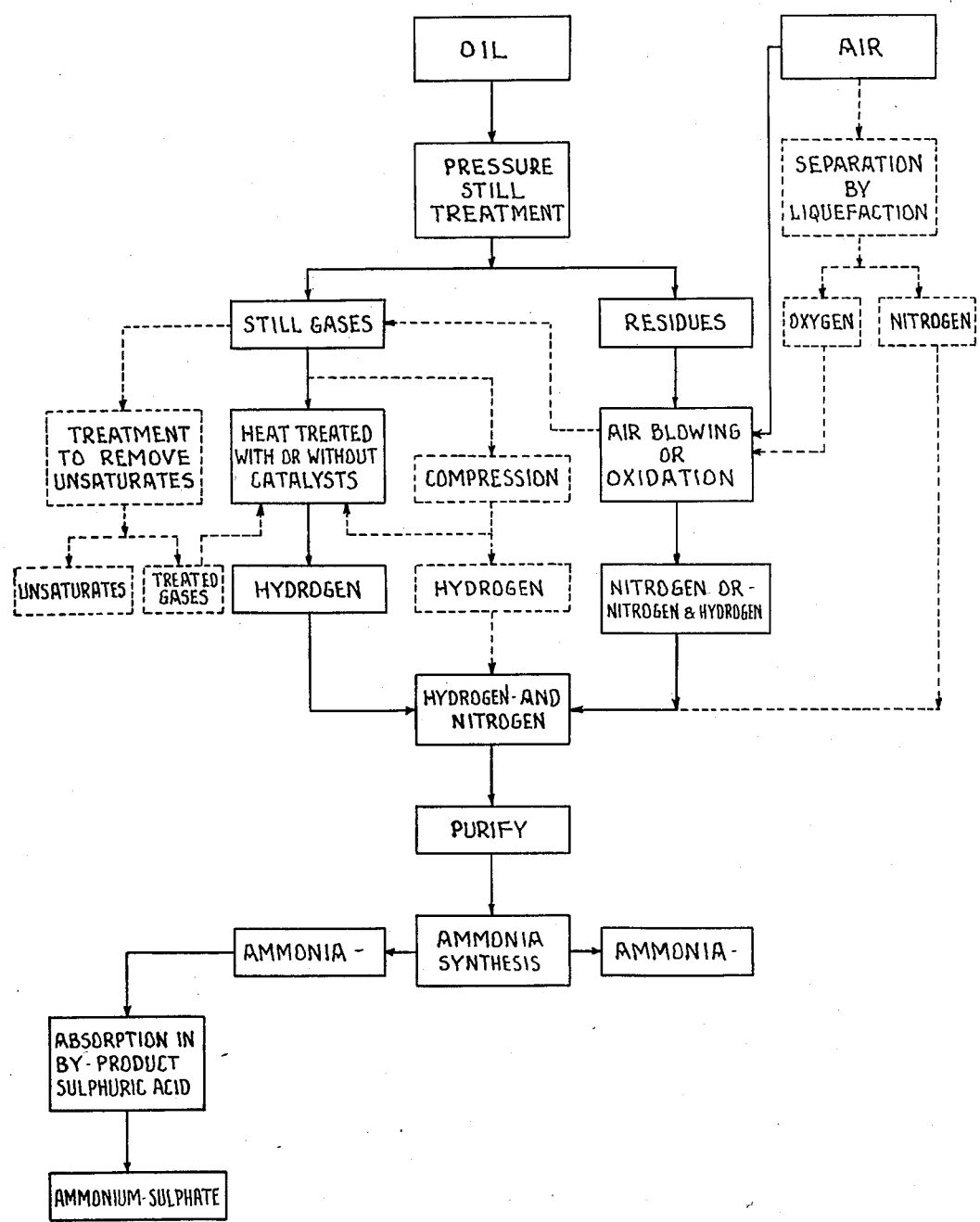

1,935,469

UNITED STATES PATENT OFFICE 1,935,469

PROCESS OF UTILIZING BY-PRODUCTS OF PETROLEUM REFINERIES TO MAKE SYNTHETIC AMMONIA

Carleton Ellis, Montclair, N. J., assignor to Ellis-Foster Company, a corporation of New Jersey Application December 24, 1925
Serial No. 77,539

1 Claim. (Cl. 23—210)

This invention relates to processes of making ammonia and to intermediate products utilizable in such processes, and more particularly to such processes utilizing waste residues from oil refineries.

In the manufacture of synthetic ammonia one of the principal items of expense is the cost of making the gases, hydrogen and nitrogen, and their purification for use in these processes. Particularly is this true in connection with the hydrogen. Further, such products as the gases from petroleum stills have generally been found to be of little value and as a result have been used about the plant for fuel.

One of the objects of this invention is the utilization of such residues in the production of gases containing hydrogen and nitrogen for synthetic ammonia manufacture. A further object of this invention is the production of such gases or mixtures of them in a condition which peculiarly adapts them to ammonia synthesis. A still further object of this invention is the utilization of heavy oils in the production of gas mixtures, peculiarly adapted to the production of ammonia synthetically. Other and further objects and advantages of this invention will appear from the more detailed description set forth below, it being understood that this more specific disclosure is given for illustrative purposes only and not by way of limitation, since various changes may be made therein by those skilled in the art without departing from the scope and spirit of the invention.

This more specific disclosure will be considered in connection with the accompanying drawing, wherein there is shown diagrammatically the steps of the process and the products derived therefrom.

Fundamentally, the source of the gases nitrogen and hydrogen may be looked upon in the process hereinafter set forth as air on the one hand, and oil residues, still gases and possibly steam on the other, the latter group of substances serving as the source of hydrogen. The still gases which are used may be derived from stills in which normal distillation is produced or from cracking operations. The heavy oils may be, for example, residues from pressure still treatment well known in the art.

The still gases contain substantial quantities of saturated hydrocarbon material, and it is primarily this saturated material which yields large quantities of hydrogen in the appropriate heat treatments referred to below. Saturated gases such as methane and ethane contain the maximum amount of hydrogen. As the molecular weight increases, the proportion of hydrogen decreases. In unsaturated compounds such as ethylene or propylene the proportion of hydrogen is of course less than in the saturated hydrocarbons. Fixed saturated gases from the distillation operations of a refinery therefore afford the best raw material for the production of hydrogen. As these gases have practically no value other than their utility as a fuel, the conversion of such gases into hydrogen which is substantially transformed into synthetic ammonia enables a by-product of low value to be transformed into a product of great commercial significance.

Still gases may be treated in several ways: First, if they contain sufficient hydrogen all that is necessary is that they be compressed to remove oils and gasoline products contained in them; second, if they do not contain sufficient hydrogen for use in the manufacture of ammonia they may be subjected to heat treatment, either with or without catalysts in order to increase their hydrogen content. A gas containing substantial amounts of hydrogen and available for ammonia synthesis is thus produced. The necessary nitrogen may be obtained either by liquefaction of air and separation of nitrogen therefrom, or by blowing air through oils or oil residues under conditions whereby the oxygen is substantially removed from the air, leaving nitrogen as the principal fixed gas. In the preferred embodiments of this invention cylic processes are made use of, wherein oil is treated to produce gaseous products containing nitrogen and hydrogen under pressure, and in a condition which particularly adapts them to the synthesis of ammonia. Several illustrative processes as diagrammatically shown in the drawing will now be given.

In one form of this invention heavy oil is placed under pressure, heated to between 400 or 500 degrees C., and air is blown therethrough. Reaction takes place with the formation of various products of oxidation, the rate of travel of the air through the oil desirably being such that the oxygen thereof is practically completely absorbed, leaving the nitrogen incorporated with the products of the reaction. Thus by heating the oil to a cracking temperature or slightly below it and passing therethrough a current of air, the oil is gradually converted into gasoline and other oxidized, condensible products, and also fixed gases. The latter contains nitrogen which may be used for reaction with hydrogen in the production of ammonia. Steam may be added to the air current passing through the oil in volume, for example, of ten per cent based upon the volume of air employed. The oxidation by the air current is an exothermic operation and if a large bulk of oil is being treated the temperature may rise undesirably high. The addition of steam has the advantage of cooling the liquid and preventing too high a temperature. Of further advantage is the fact that the reaction of the steam in the processes results in the production of hydrogen. A larger percentage of steam may be employed if some pure oxygen is admitted, as for example, oxygen obtained by separation from the air in liquefaction processes. The process may be carried out with suitable preheaters or heat interchangers, so that the incoming current of air is heated considerably before coming into contact with the oil. The products of the operation containing hydrogen and nitrogen, are passed through condensers and finally may be treated with activated carbon or silica gel desirably under pressure in the current of fixed gases, and the residual gases may then be compressed and liquefied to remove most components with the expansion of the hydrogen and the nitrogen. The gases so obtained may be desirably carried through the purification steps just disclosed under the pressure in which they were obtained from the reaction chamber, and by retaining this pressure on the gases they are peculiarly adapted to the ammonia synthesizing operations, which are carried out under pressure. Further, the gases so obtained may contain the hydrogen and nitrogen in proportion (3 : 1) in which they are to be used for the manufacture of ammonia, but if not present in these proportions they may be fortified with additional hydrogen, in order to being the proportion of mixed gases approximately to that ratio. The mixed gases should desirably be in a pure condition, and they may be purified either separately or in the admixed state, by absorbing carbon di-oxide, oxygen, carbon monoxide and catalyzer poisons. Moisture also is preferably removed. But it should be noted that in the preferred embodiment of such processes the gases are carried through such desired purification steps without releasing the pressure under which they have been obtained from the reaction zone, in order that this pressure may be utilized in the ammonia synthesizing operation without the necessity of recompressing the gases for that purpose. The mixed gases thus produced, if not under a sufficient pressure for the purpose, are brought to the pressure desired in the ammonia synthesizing processes, which may range from below 100 up to 1000 atmospheres, and are then passed over a heated catalyst, as for example, fused or sintered metallic iron maintained at a temperature of about 500 degrees C., in order to produce ammonia.

As a further illustration of one mode of carrying this invention into practice, pressure still gases from the condensers, (and which may or may not be subjected to any desired treatment such as compression or liquefaction to remove unsaturates), are admixed with steam and passed over a nickel catalyst at a temperature of from 800 to 900° C. The hydrogen obtained is admixed with nitrogen obtained desirably as follows.

The residues from the pressure stills which are not further amenable to cracking in the usual manner, are run off into an oxidizer where they are subjected to the action of a preheated current of air at a pressure of 10 to 25 atmospheres. Substantially higher pressures may be used if desired. Oxidation of the residues with the formation of additional gasoline and various water-soluble oxygen-containing liquids, occurs. After removal of these, without necessarily releasing the pressure on the gases, the nitrogen is collected, and may then be mixed with hydrogen and subsequently purified. By maintaining the pressure on the gases so produced, during the purification steps, the necessity of again compressing the gases during the ammonia synthesizing step is eliminated, and an economy is thus obtained.

A 3:1 mixture of this hydrogen and nitrogen is passed through a contact mass of sintered iron of high purity, the temperature being about 425 to 500° C. and the pressure about 275 atmospheres. Leaving the contact mass, the gases which now contain ammonia are passed into absorbers containing by-product sulphuric acid. The ammonia is absorbed to form ammonium sulphate and the unconverted gases are further utilized. The by-product sulphuric acid often contains nitrogenous substances which have been extracted from the oils or gases treated. These substances thus add to the sum total of available nitrogen. When the acid is saturated with ammonia, the liquor is evaporated to dryness or otherwise treated.

In the operation of treating the still gases catalytically, as set forth above, these gases, which contain hydrogen, methane, ethane, etc., are treated by a nickel catalyst for example, and under the conditions above enumerated, conversion of a good portion of the hydrocarbons into carbon dioxide and carbon monoxide is obtained. Desirably, the operation is conducted to as completely as possible, produce carbon dioxide instead of carbon monoxide, but where this is not feasible, a further addition of steam may be made and further treatment by passage over an iron catalyzer, for example, to convert the monoxide to the dioxide. Final traces of carbon monoxide may be removed to a very large extent by absorption under pressure in suitable absorbing agents, such as copper formate or oxalate, the carbon dioxide being taken out by absorption under pressure in water or milk of lime solutions or solutions of caustic soda, etc. The purpose of the operation is to produce as nearly as possible, pure hydrogen, practicaly free from oxygen, oxidizing agents, and bodies such as sulphur, which may have a poisoning action on the catalyzer hereinafter described employed for the production of synthetic ammonia.

Instead of subjecting the still gases to a catalytic treatment, these gases may be subjected to a heat treatment without the use of a catalyzer, in order to increase their content of hydrogen. For example, still gases are conveyed to a pyrolyzer or chamber where they are subjected to a high temperature, as for example, 1200° C. or higher, in order to break down the hydrocarbons present to free hydrogen and lamp black. The lamp black or gas black is suitably collected and may be used as a pigment, etc. The hydrogen is passed through suitable purifiers to remove sulphur and other catalyzer poisons and is admixed with nitrogen gas.

The pyrolyzer or thermolyzer may be electrically heated as for example by means of arcs or resistor elements or external heat may be applied to the gases which are passed through heating tubes; or a mass of refractory material may be heated white hot and the gases passed therethrough until the temperature falls below the point where break-down to lampblack and hydrogen occurs.

Before subjecting the still gases to such heat treatment for the production of hydrogen therein, the gases may be first treated in any satisfactory manner to remove unsaturates as set forth above. But this phase of the invention is not limited to using gases which have been previously treated to remove unsaturates, but embraces any kind of refinery gas adapted to be employed as a source of hydrogen, either by pyrolysis as indicated, either with or without catalysts, or by extraction of the hydrogen through diffusion, liquefaction, or in other ways. And while the step of treating such gases before heat treatment, is not an essential element in this process, it offers substantial advantages in that the removal of various impurities by this treatment is useful in connection with the production of hydrogen of the desired quality for the catalytic process of conversion into ammonia.

In carrying out the decomposition of the still gases to produce hydrogen, it is desirable to use heat interchangers in order that the still gases entering the pyrolyzer may be preheated by the transfer of heat from the outgoing products of decomposition. Suitable heat interchangers therefore are preferably employed to transfer the heat from the hydrogen to the incoming still gases. In like manner, gases such as natural gas, casing-head gas, and the like may be decomposed to supply hydrogen.

As pointed out above, the second problem connected with the production of ammonia through the agency of the by-products of a refinery, is obtaining nitrogen gas. While as stated, nitrogen is present in still gases, its quantity is not such as will ordinarily suffice for reaction with the hydrogen available to completely convert the latter to ammonia. The source of nitrogen directly or indirectly is therefore from the atmosphere and the nitrogen obtained either directly or indirectly from this source is hereinafter termed atmospheric nitrogen.

For example, nitrogen may be obtained by passing air through a gas producer yielding a mixture of nitrogen, carbon monoxide, some carbon dioxide and small quantities of other products. Producer gas can be made by means of a mixture of air and steam which will contain substantial quantities of hydrogen. The nitrogen may be separated from the other gases by various washings and absorptions, liquefactions, etc., in order to obtain the nitrogen in a state of purity. Nitrogen may also be obtained from products of combustion as for example by passing a mixture of oil spray and air through a mass of refractory material to carry out a species of surface combustion enabling the almost complete conversion of the oxygen to carbon dioxide. Washing the products of combustion with water and milk of lime, etc., can be employed to eliminate the carbon dioxide and the oxygen can be removed by suitable absorption.

And while as pointed out above nitrogen may be obtained by liquefaction from the air, it is preferable to produce nitrogen by oxidation of oil. The usual method of cracking oil is simply to heat under pressure and remove the volatile products of the heat decomposition. If however the oil ordinarily employed for cracking purposes is heated under pressure and air blown through it, reaction may be brought about with the oil, oxidized products being obtained and light hydrocarbons produced, while nitrogen is yielded as a by-product. Thus air may be passed through a deep layer of heavy oil under a pressure of 50 to 100 pounds, or even much higher pressures as for example from 20 to 30 atmospheres, the temperature of the oil being maintained at a point where the oxygen readily reacts with the oil and generates heat sufficient to maintain the reaction chamber at a proper temperature, which may be slightly below ordinary cracking temperatures. The air entering the chamber is desirably preheated. From the products of reaction after removal of the condensable hydrocarbons and fixed gases other than hydrogen and nitrogen the latter gases are collected and suitably purified, or they may first be mixed with additional hydrogen obtained as above, if necessary, in order to bring the ratio of the gases to 3:1 hydrogen to nitrogen, and this mixture then suitably purified. Such purification is desirably carried out while maintaining the pressure on the gases since in this way, it is unnecessary to again compress the gases, or when the pressures in the ammonia synthesizing operation are higher than the pressure on the gases as obtained from the reaction zone, a much smaller amount of work is necessary to be done on them in order to compress them to the higher pressures.

Since as emphasized above, the gases from petroleum stills, contain hydrogen, such hydrogen may be separated therefrom without necessarily subjecting the still gases to a heat treatment step to increase the amount of hydrogen present. Gases from cracking stills, for example, especially pressure stills, may be used at the pressure obtaining in such stills, say at 90 to 125 pounds, or more, and thus will save the expense of that degree of compression which may represent perhaps one stage of compression in preparing the gases for catalytic treatment.

Thus the gases from pressure stills used in carrying out the Burton process may be used. The gases may first be given a treatment to remove unsaturates as pointed out above. From the treated or untreated gases as the case may be, hydrogen may be obtained by liquefaction. For example, the gases are compressed to from 25 to 30 atmospheres in order to separate oils, etc., and if carbon dioxide is present, the gases are allowed to pass through a tower down which water trickles. A small amount of milk of lime may be introduced at the top of the tower. This treatment under pressure will serve to remove carbon dioxide, sulphur dioxide, and the like. If air has not obtained access to the stills, very little carbon dioxide or monoxide is likely to be present, and the treatment should be modified according to the nature of the impurities present. For the catalytic process of making ammonia, the best results are obtained by having the gases, hydrogen and nitrogen, free from moisture, oxygen, carbon dioxide, carbon monoxide, and catalyzer poisons such as sulphur or arsenic. Gases heretofore generally employed as a source of hydrogen contain large amounts of carbon dioxide and monoxide, as for example, water gas, and expensive purification is necessary. Still gases, employed according to the invention herein set forth, usually contain little or no carbon dioxide or monoxide, which is highly advantageous.

If carbon dioxide is not present to an extent that the pipes of the compression plant are choked by solid carbon dioxide, the purification step to eliminate this impurity may not be employed necessarily at this stage. In other words, instead of removing carbon dioxide, the principal object of the compression at this point should be to separate the oils and light gasoline products; or carbon dioxide, ethylene, propylene, etc., may be separated by compression from oils, light hydrocarbons, etc.

These products may be utilized in various ways.

1. Liquids which are not too light or "wild" may be added to gasoline to increase the ease of ignition.

2. The very light liquefied products may be compressed into cylinders to supply a source of gas for welding purposes or for other applications. A selection should be made of bodies which vaporize readily on release of pressure, so that the contents of the cylinders may be fully utilized.

3. The unsaturated components thus separated being of a reactive nature, may be treated with suitable reagents to convert them into other products, for example, chlor-compounds, mustard gas, etc., etc.

Further compression separates methane, ethane, etc., carbon monoxide, if present, and any nitrogen which may be present. In this way by compression and liquefaction in stages various products may be removed leaving fairly pure hydrogen. If the quantity normally present in the gas is not enough, further quantities may be obtained by heating the still gases to a high temperature as for example 1200° C., or higher, or lower temperatures may be used when catalysts are used at this stage, to break down the hydrocarbons into hydrogen and carbon. In this way the separation of hydrogen from the still gases by liquefaction, etc., may be profitably combined with a heat treatment step as set forth more fully above, in order to increase the amount of hydrogen present in those gases prior to such liquefaction separation, or residues from the separation of hydrogen by liquefaction may be heat treated to produce further hydrogen, thus obtained in any desired way, may be suitably purified.

Any suitable source for the nitrogen may be used. The oil treatment process outlined above is of advantage since the gas is produced under a pressure, with or without hydrogen present, that particularly adapts it for the ammonia synthesizing operations. By treatment of heavy oil preferably under pressure, with oxygen, a cracking effect may be obtained at temperatures somewhat above 200° C., and the heat of oxidation will generate sufficient internal heat to maintain a cracking temperature, or may in some cases exceed the desired temperature in which case cooling will be employed.

Cracking and oxidizing heavy oils leads to a mixture of products. Gasoline and heavier distillates will be produced along with the formation of some tar and carbon. Hydrocarbons will be oxidized, some to water-insoluble bodies, others to bodies such as fatty acids and other products which are soluble in water. The gasoline etc., may be condensed or separated in suitable condensers, and by absorption with activated carbon or silica gel, etc., by scrubbing with water, alkali solutions, or in some cases by scrubbing with oil or other appropriate solvents, desirable bodies may be separated. If a very obstinate fume is formed, means such as electrical precipitation, silica gel, or activated carbon may be applied.

The use of oxygen in a non-diluted state may lead to the formation of peroxides or other oxygenated bodies which have explosive properties. The danger of forming peroxides should be considered as it is not desirable that any large amount of such compounds should accumulate in the system. Preferably therefore the temperature should be kept above that point at which peroxides may exist. Thus temperatures of 350 to 500° C. are recommended if an oil shows a tendency to the formation of peroxides. Hence oils may be examined in reference to their tendency to form peroxides and conditions imposed to largely or entirely preclude such formation or at least formation to an objectionable degree. Oxygen may be diluted with air, steam, nitrogen or products of combustion when it is desired to have a less active oxidizing effect.

Catalyzers may be added to the oil either to assist in the reaction or to prevent the formation of peroxides. For example, there may be added to the oil, small amounts of copper formate or iron oxide or hydrate.

In place of producing the nitrogen by passing air into liquid petroleum at appropriate temperatures and pressures, petroleum vapors, or cracked petroleum vapors, may be used, such vapors being mixed with air desirably in amount less than that required for complete combustion, and the gaseous and vaporous mixture, then passed over a heated catalyst whereby the oxygen is consumed. The gases and vapors are then treated to separate nitrogen therefrom, and such nitrogen may then be used for ammonia synthesis. Since as pointed out above, it is evident that in this way the cracked gases may serve as a source for both the nitrogen and for the hydrogen, which are necessary in the synthesis of ammonia.

As set forth therefore, in the preferred form of this invention, the process herein disclosed includes a cyclic organization of steps wherein the gases necessary for the manufacture of ammonia are derived from gases and residues in oil treatment plants and refineries. The drawing illustrates the interlocking features of this organization of steps or inter-related operations accomplishing this objective.

Oil is subjected to pressure still treatment, as set forth above, with the production of still gases and residues. The still gases serve primarily as a source of hydrogen and may be subjected to either heat treatment with or without catalysts, to increase its hydrogen content, or where the hydrogen content of the still gases is sufficiently high without further heat treatment, the hydrogen may be separated from such gas mixtures by compression. In either event, hydrogen in peculiar condition for ammonia synthesis is produced as more fully set forth above. Prior to the heat treatment, or compression treatment of the still gases, they may be treated to effect a purification. If this be done, the gases are then subjected to proper treatment to yield hydrogen.

The residues from the pressure still treatment referred to above are subjected to an air blowing or oxidation treatment, with either air or with oxygen, which has been separated by liquefaction from the air. When air is used under conditions fully set forth above, the oxygen may be completely eliminated therefrom, yielding a gaseous mixture containing nitrogen. This operation being desirably carried out under pressure yields a nitrogen from which any impurities may be easily eliminated, but which is under high pressure and is accordingly peculiarly adapted to ammonia synthesis. This is true whether the nitrogen is obtained by deoxygenation of air by heated oil, or whether nitrogen is obtained by liquefaction from air, since in either event nitrogen under pressure is obtained, which pressure is maintained for further use of this nitrogen in ammonia synthesis. If steam is added to the air, as explained above, a mixture of nitrogen and hydrogen under pressure can be obtained, and in fact, the gases may be produced in proportions directly adapting them to making ammonia, but where this is not the case, additional gases may be added to properly proportion the gases in the mixture. If oxygen alone is used, gases are produced which may be utilized particularly at low pressure in the production of hydrogen. Nitrogen thus produced containing more or less hydrogen according to the method of production, is admixed with hydrogen produced from the still gases. These gases in proper proportions may be subjected to purification when necessary without relieving the pressure under which they have been formed, so that a purified gaseous mixture is produced which is then passed into the ammonia synthesis chamber. The ammonia produced may be collected in any conventional manner, or it may be absorbed by sulphuric acid. If so absorbed, ammonium sulphate is produced which is subsequently recovered.

In the air-blowing or oxidation treatment of oils described above, any ammonia or ammonia compounds, amines or other nitrogen compounds formed by contact of air with oil under high pressures and temperatures are removed and recovered in the various purification processes involved. When casinghead-gas is broken down by heat to yield hydrogen, such heat may be supplied by the combustion of an additional portion of the casinghead-gas. When the air-blowing process is carried out near a source of casinghead-gas, the hydrogen and nitrogen obtained in this manner are cheaply available for the manufacture of ammonia.

Having thus set forth my invention, I claim:

In the utilization of petroleum refinery by-products, the steps which consist in separating hydrogen from gases of pressure cracking stills, maintaining the pressure on such hydrogen, and utilizing said hydrogen in catalytic hydrogenation under pressure.

CARLETON ELLIS.